US007668807B2

(12) United States Patent
Dettinger et al.

(10) Patent No.: US 7,668,807 B2
(45) Date of Patent: Feb. 23, 2010

(54) QUERY REBINDING FOR HIGH-AVAILABILITY DATABASE SYSTEMS

(75) Inventors: Richard D. Dettinger, Rochester, MN (US); Daniel P. Kolz, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/064,717

(22) Filed: Feb. 24, 2005

(65) Prior Publication Data
US 2006/0190434 A1 Aug. 24, 2006

(51) Int. Cl.
*G06F 17/30* (2006.01)
*G06F 17/00* (2006.01)

(52) U.S. Cl. .................................. 707/3; 707/104.1
(58) Field of Classification Search .................. 707/3, 707/104.1; 705/1
See application file for complete search history.

(56) References Cited

U.S. PATENT DOCUMENTS 6,725,227 B1 4/2004 Li
2002/0184202 A1* 12/2002 Hara et al. ..................... 707/3
2003/0208486 A1* 11/2003 Dettinger et al. ............... 707/6
2005/0278741 A1* 12/2005 Robarts et al. ............... 725/46

OTHER PUBLICATIONS

U.S. Appl. No. 10/083,075, "Application Portability and Extensibility Through Database Schema and Query Abstraction", filed Feb. 26, 2002.
U.S. Appl. No. 11/016,201, "Transformation of a Physcial Query into an Abstract Query", filed Dec. 17, 2004.
U.S. Appl. No. 10/955,467, "Metadata Management for a Data Abstraction Model", filed Sep. 30, 2004.

* cited by examiner

*Primary Examiner*—Charles Rones
*Assistant Examiner*—Fariborz Khoshnoodi
(74) *Attorney, Agent, or Firm*—Patterson & Sheridan, LLP

(57) ABSTRACT

Embodiments of the invention allow for managing execution of queries with respect to different data sources. The different data sources are logically represented by data abstraction models. One embodiment comprises receiving a first abstract query against physical data in a first data source. The first abstract query has result fields configured to return requested data from the first data source. In response it is detected whether the first data source is available. If the first data source is unavailable, a second abstract query against physical data in a second data source containing a portion of the requested data is created on the basis of the first abstract query. The second abstract query has result fields configured to return the portion of the requested data from the second data source. The second abstract query is executed against the second data source to obtain the portion of the requested data.

16 Claims, 8 Drawing Sheets

QUERY REBINDING FOR HIGH-AVAILABILITY DATABASE SYSTEMS

CROSS-RELATED APPLICATION

This application is related to the following commonly owned applications: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION"; U.S. patent application Ser. No. 11/016,201 filed on Dec. 17, 2004, entitled "TRANSFORMATION OF A PHYSICAL QUERY INTO AN ABSTRACT QUERY", U.S. patent application Ser. No. 10/955,467, filed on Sep. 30, 2004, entitled "METADATA MANAGEMENT FOR A DATA ABSTRACTION MODEL", all of which are hereby incorporated herein in their entireties.

BACKGROUND OF THE INVENTION

1. Field of the Invention

The present invention generally relates to query processing and, more particularly, to managing execution of queries with respect to different data sources.

2. Description of the Related Art

The creation of increasingly powerful computer systems and a continuously improved information technology (IT) infrastructure contribute to a progressive automation of key tasks and processes in today's businesses. As a result, business processes, such as shipping, procurement and staffing, are transformed so as to be conducted electronically. Such electronically conducted business processes are referred to as electronic business (e-business). A generally accepted widely-used form of e-business is electronic commerce (e-commerce). E-commerce permits transactions for a variety of goods and services to be conducted electronically.

However, while use and development of e-business proliferate, unplanned downtimes of computer systems in companies cause losses of thousands of dollars or more per hour to these companies. Accordingly, prevention of unplanned downtime of computer systems becomes a key challenge in today's business world.

To help alleviate the problem of unplanned downtime, many companies employ strategies termed High Availability (HA). A popular HA strategy is to mirror an original computer system, i.e., to make an exact duplicate of the computer system. Thus, when unplanned downtime of the original computer system occurs, the duplicate or mirror system is able to pick up any tasks that could not be completed by the original computer system before the downtime occurred.

However, mirroring a complete computer system is relatively expensive. More specifically, mirroring an original computer system generally requires another set of appropriate hardware, middleware, and software licenses. Accordingly, the expenses for creating a mirror system for the original computer system could equal the cost of the original computer system. In other words, mirroring the original computer system could easily involve expenses of hundreds of thousands of dollars or more for a given company. Furthermore, if the original computer system includes a database(s) which is frequently updated or otherwise modified, each such change must essentially be replicated in real-time to the mirror system so that the mirror system continuously represents an exact copy of the original computer system. This requires intensive and costly maintenance of the mirror system.

Therefore, there is a need for an efficient technique for providing a high-availability system.

SUMMARY OF THE INVENTION

The present invention is generally directed to a method, system and article of manufacture for query processing and, more particularly, for managing execution of queries with respect to different data sources.

One embodiment provides a computer-implemented method for managing execution of queries querying physical data logically represented by a data abstraction model. The method comprises receiving a first abstract query against physical data in a first data source. The first abstract query has one or more result fields configured to return requested data from the first data source, each result field having a corresponding logical field specification of a first data abstraction model. Each corresponding logical field specification describes an access method for accessing physical data in the first data source. In response to receiving the first abstract query and determining that the first abstract query is configured for retrieving data from the first data source, it is detected whether the first data source is available. If the first data source is unavailable, a second abstract query against physical data in a second data source containing at least a portion of the requested data is created on the basis of the first abstract query. The second abstract query has one or more result fields configured to return at least the portion of the requested data from the second data source. Each result field of the second abstract query has a corresponding logical field specification of a second data abstraction model abstractly describing the second data source, wherein each corresponding logical field specification describes an access method for accessing physical data in the second data source. The second abstract query is executed against the second data source to obtain at least the portion of the requested data.

Another embodiment provides a computer-implemented method for managing execution of queries querying physical data logically represented by a data abstraction model, comprising receiving a first abstract query against queryable data in a data warehouse. The first abstract query has one or more result fields configured to return requested data from the data warehouse, each result field having a corresponding logical field specification of a first data abstraction model. Each corresponding logical field specification describes an access method for accessing physical data in the data warehouse. In response to receiving the first abstract query and determining that the first abstract query is configured for retrieving data from the data warehouse, it is detected whether the data warehouse is available. If the data warehouse is unavailable, a second abstract query against physical data in an operational data store containing all the queryable data of the data warehouse is created on the basis of the first abstract query. The data warehouse and the operational data store use differently structured data structures. The second abstract query has one or more result fields configured to return the requested data from the operational data store. Each result field of the second abstract query has a corresponding logical field specification of a second data abstraction model abstractly describing the operational data store, wherein each corresponding logical field specification describes an access method for accessing physical data in the operational data store. The second abstract query is executed against the operational data store to obtain the requested data.

Another embodiment provides a computer-readable medium containing a program which, when executed by a processor, performs operations for managing execution of queries querying physical data logically represented by a data abstraction model. The operations comprise receiving a first abstract query against physical data in a first data source, the first abstract query having one or more result fields configured to return requested data from the first data source. Each result field has a corresponding logical field specification of a first data abstraction model, wherein each corresponding logical field specification describes an access method for accessing physical data in the first data source. The operations further comprise, in response to receiving the first abstract query and determining that the first abstract query is configured for retrieving data from the first data source, detecting whether the first data source is available. If the first data source is unavailable, a second abstract query against physical data in a second data source containing at least a portion of the requested data is created on the basis of the first abstract query. The second abstract query has one or more result fields configured to return at least the portion of the requested data from the second data source. Each result field of the second abstract query has a corresponding logical field specification of a second data abstraction model abstractly describing the second data source, wherein each corresponding logical field specification describes an access method for accessing physical data in the second data source. The second abstract query is executed against the second data source to obtain at least the portion of the requested data.

Still another embodiment provides a system comprising a first data source having physical data, a second data source having physical data including at least some of the physical data contained in the first data source, and a query builder component for managing execution of queries querying physical data logically represented by a data abstraction model. The query builder component is configured to (i) receive a first abstract query against the physical data in the first data source, the first abstract query having one or more result fields configured to return requested data from the first data source, each result field having a corresponding logical field specification of a first data abstraction model, wherein each corresponding logical field specification describes an access method for accessing physical data in the first data source; (ii) detect, in response to receiving the first abstract query and determining that the first abstract query is configured for retrieving data from the first data source, whether the first data source is available; and (iii) if the first data source is unavailable: (a) create, on the basis of the first abstract query, a second abstract query against the physical data in the second data source containing at least a portion of the requested data, the second abstract query having one or more result fields configured to return at least the portion of the requested data from the second data source, each result field of the second abstract query having a corresponding logical field specification of a second data abstraction model abstractly describing the second data source, wherein each corresponding logical field specification describes an access method for accessing physical data in the second data source; and (b) execute the second abstract query against the second data source to obtain at least the portion of the requested data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Overview

Figure 1:
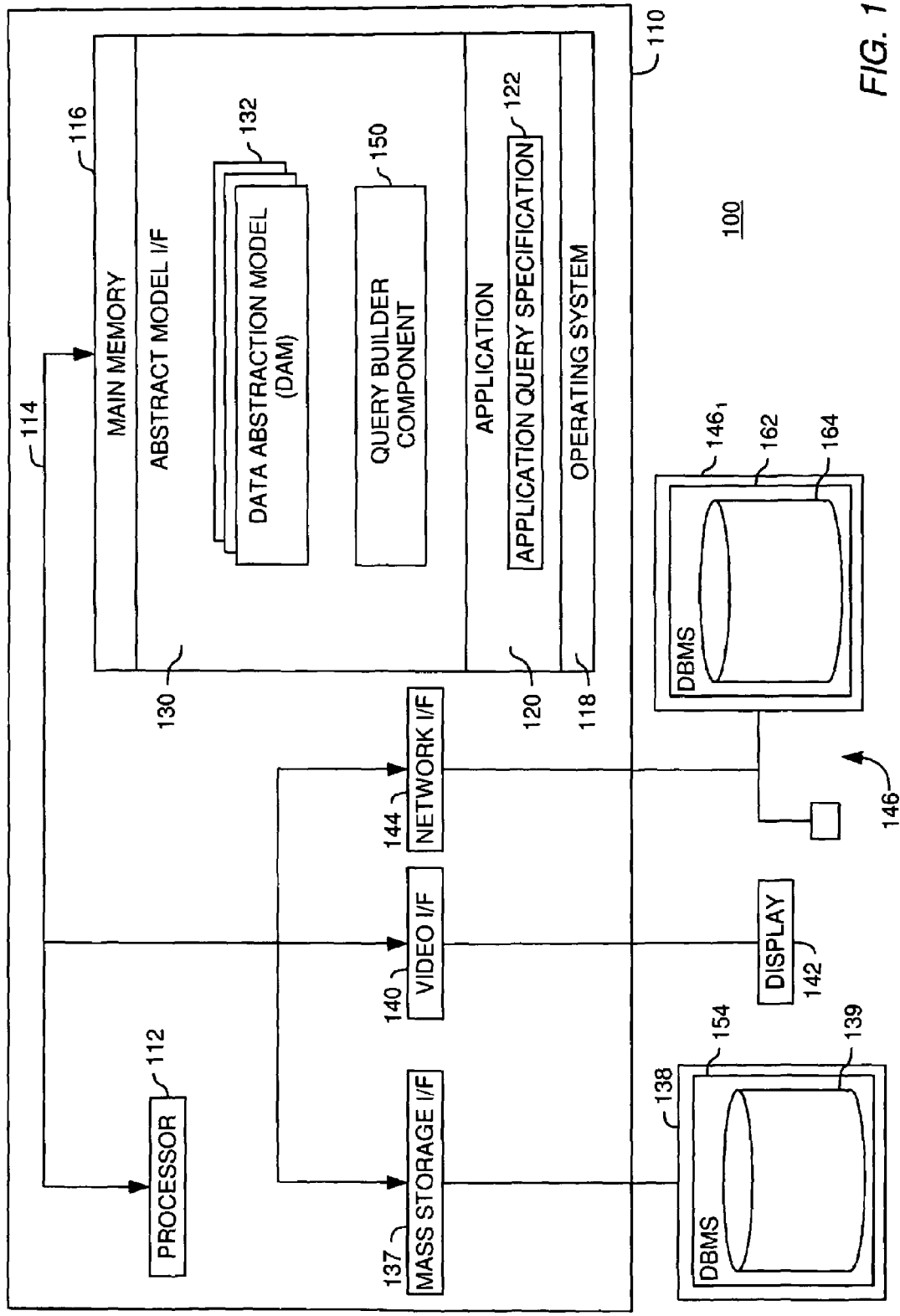
FIG. 1 is a computer system illustratively utilized in accordance with the invention.

The present invention describes techniques that are suitable to provide high-availability database systems. Embodiments of the present invention leverage the availability of redundant data and a corresponding data abstraction model(s) to provide such high-availability database systems.

By way of example, assume that an original computer system contains a data warehouse. A data warehouse is a summary and restructuring of a subset of information contained in an operational data store in a schema which is highly optimized for queries involving many rows and aggregation functions. Accordingly, the data warehouse only contains a valuable fraction of the information included in the operational data store. Assume further that the operational data store is hosted on another computer system. Operational data stores are generally structured for tasks like order entry and retrieval which involve very few rows and many insert and update operations. As the operational data store contains all information contained in the data warehouse and is stored on a different computer system, the operational data store could be used as mirror of the data warehouse. Accordingly, the data warehouse and the operational data store could be used to define a high-availability database system.

However, one difficulty in using the operational data store as mirror of the data warehouse results from the radically different ways in which operational data stores and data warehouses generally structure data contained therein. Accordingly, a query issued against the data warehouse can not readily be executed against the operational data store. Instead, a specific query needs to be created against the data warehouse and another specific query against the operational data store in order to obtain an identical query result. This drawback currently prevents operational data stores of being used as mirrors for corresponding data warehouses.

More generally, it is difficult to use a given data source containing all information of another data source as mirror of that other data source if both data sources are not structured identically, i.e., if the given data source and the other data source have similar physical data but dissimilar data structures. For instance, physical data that is contained in a particular column of a particular table of the given data source can be contained in a different column of an identical or another table in the other data source. By way of example, consider patient identifiers that are contained in a column "ID" of a "PATIENT" table in the given data source. The same patient identifiers may be contained in a column "PATIENT_ID" of a table "DEMOGRAPHIC" of the other data source. Thus, a query structured to be run against the given data source cannot be arbitrarily redirected and run against the other data source, because the respective tables are structured differently.

Embodiments of the present invention address these difficulties with the provision of a data abstraction model(s) that abstractly describes physical data contained in various disparate data sources. According to one aspect, the physical data in the multiple data sources is accessed using one or more data abstraction models which abstractly describe the physical data. A data abstraction model defines a logical representation of the physical data. Using a data abstraction model, abstract queries against the physical data can be constructed without regard for the makeup of the physical data. The data abstraction model is adapted for facilitating transformation of the abstract queries into a form consistent with a physical representation of the physical data. The concepts of data abstraction models and abstract queries are described in detail in the commonly owned, co-pending application Ser. No. 10/083,075 (hereinafter referred to as the '075 application), entitled "APPLICATION PORTABILITY AND EXTENSIBILITY THROUGH DATABASE SCHEMA AND QUERY ABSTRACTION", filed Feb. 26, 2002, herein incorporated by reference in its entirety. Using a data abstraction model(s) according to the framework of the '075 application, execution of queries querying physical data in various disparate data sources that is logically represented by a data abstraction model(s) can be managed to provide a high-availability database system.

Introduction

The present invention generally is directed to a method, system and article of manufacture for query processing and, more particularly, for managing execution of queries querying physical data logically represented by a data abstraction model. According to one aspect, a data abstraction model defines a plurality of logical fields, each having a corresponding logical field specification. Each logical field specification may include a field name and access information for mapping the logical field to one or more physical entities of physical data. Accordingly, a given logical field defines an abstract representation of a specific set of the physical data and the access information can be used to access a field of the physical data which contains the specific set of the physical data.

In one embodiment, execution of abstract queries is managed, where the queries query physical data which is logically represented by a data abstraction model. The physical data is contained in a first data source and at least a portion of the physical data is contained in a second data source, the first and second data sources having dissimilar data structures. In the context of the present invention, dissimilar data structures include, for instance, different database schemas, different database tables and database tables having different columns. A first data abstraction model abstractly describes the physical data in the first data source and a second data abstraction model abstractly describes the physical data in the second data source. Alternatively, the physical data in both data sources can be abstractly described by a single data abstraction model having a distinct section for each data source. More generally, embodiments of the invention are not limited to any particular number of data sources and data abstraction models.

In response to receiving an abstract query and determining that the abstract query is configured for retrieving data from the first data source, an availability monitor determines the status of the first data source in order to determine whether the first data source is available. If the first data source is unavailable, a query rebinding component may rewrite the abstract query for execution against the second data source. In other words, the query rebinding component is configured to transform the abstract query, which is consistent with the first data abstraction model, into a rebound abstract query, which is consistent with the second data abstraction model. Transforming the abstract query into the rebound abstract query is performed using predefined mappings between the first and second data abstraction models. Such mappings can be stored in a suitable mapping file as a persistent data object.

According to aspects of the invention, rewriting the abstract query into the rebound abstract query can be made dependent on respective instructions. For instance, if the availability monitor detects that the first data source is unavailable, a requesting entity issuing the abstract query can be notified that the first data source is unavailable. Furthermore, the requesting entity can be requested to grant permission for use of the second data source, wherein the abstract query is only rewritten if the permission is granted.

It should be noted that embodiments of the present invention can be explained below, by way of example, with reference to particular data abstraction models, such as a data abstraction model according to the framework of the '075 application. However, other embodiments can be implemented using other types of logical models which abstractly describe physical data. Accordingly, the present invention is not limited to a particular data abstraction model, including data abstraction models according to the framework of the '075 application, and various different logical models of physical data which abstractly describe the physical data are broadly contemplated.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Exemplary Data Processing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130 to a plurality of data abstraction models 132. The applications 120, the abstract model interface 130 and the data abstraction models 132 are software products comprising a plurality of instructions that are resident at various times in various memory and storage devices in the computer system 110. When read and executed by one or more processors 112 in the computer system 110, the applications 120, the abstract model interface 130 and the data abstraction models 132 cause the computer system 110 to perform the steps necessary to execute steps or elements embodying the various aspects of the invention.

The applications 120 (and more generally, any requesting entity, including the operating system 118) are configured to issue queries against a database 139. Illustratively, the database 139 is shown as part of a database management system (DBMS) 154 in storage 138. Although only one database is shown for simplicity, the DBMS 154 may include multiple databases. Further, the databases may be distributed relative to one another. Moreover, one or more databases can be distributed to one or more of the networked devices 146. Illustratively, a networked device $146_1$ is shown having a DBMS 162 which includes a database 164. Although only a single database 164 is shown with the DBMS 162, for simplicity, the DBMS 162 may include multiple databases. Further, the databases of the DBMS 162 may be distributed relative to one another. All such different implementations are broadly contemplated.

The databases 139 and 164 are representative of any collection of data regardless of the particular physical representation of the data. A physical representation of data defines an organizational schema of the data. By way of illustration, the databases 139 and 164 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the database 139 includes a data warehouse and the database 164 includes an operational data store. The operational data store includes at least a portion of the physical data contained in the data warehouse. According to one aspect, the data warehouse contains queryable data which is derived from physical data in the operational data store. Accordingly, the queryable data in the data warehouse includes a subset of the physical data in the operational data store. In addition to the subset of data from the operational data store, the data warehouse may include other data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") can be composed using logical fields defined by one of a plurality of data abstraction models 132.

In one embodiment, each of the data abstraction models 132 defines a multiplicity of logical fields. A logical field defines an abstract view of data whether as an individual data item or a data structure in the form of, for example, a database table. Abstract queries are executed against the database 139 by a query builder component 150 which first transforms the abstract queries into concrete queries having a form consistent with the physical representation of the data contained in the database 139. Operation of the query builder component 150 for transformation of abstract queries into concrete queries and execution of the concrete queries is described below with reference to FIGS. 2-5.

In one embodiment, the query builder component 150 is further configured to support creation of abstract queries. More specifically, the query builder component 150 is configured to formulate an abstract query for execution against a given data source (e.g., database 139). The query builder component 150 may further rewrite the abstract query in order to allow execution of the rewritten abstract query against another data source (e.g., database 164), as will be described in more detail below. Operation of the query builder component 150 for rewriting abstract queries is further described below with reference to FIGS. 6-8.

Logical/Runtime View of Environment

Figure 2:
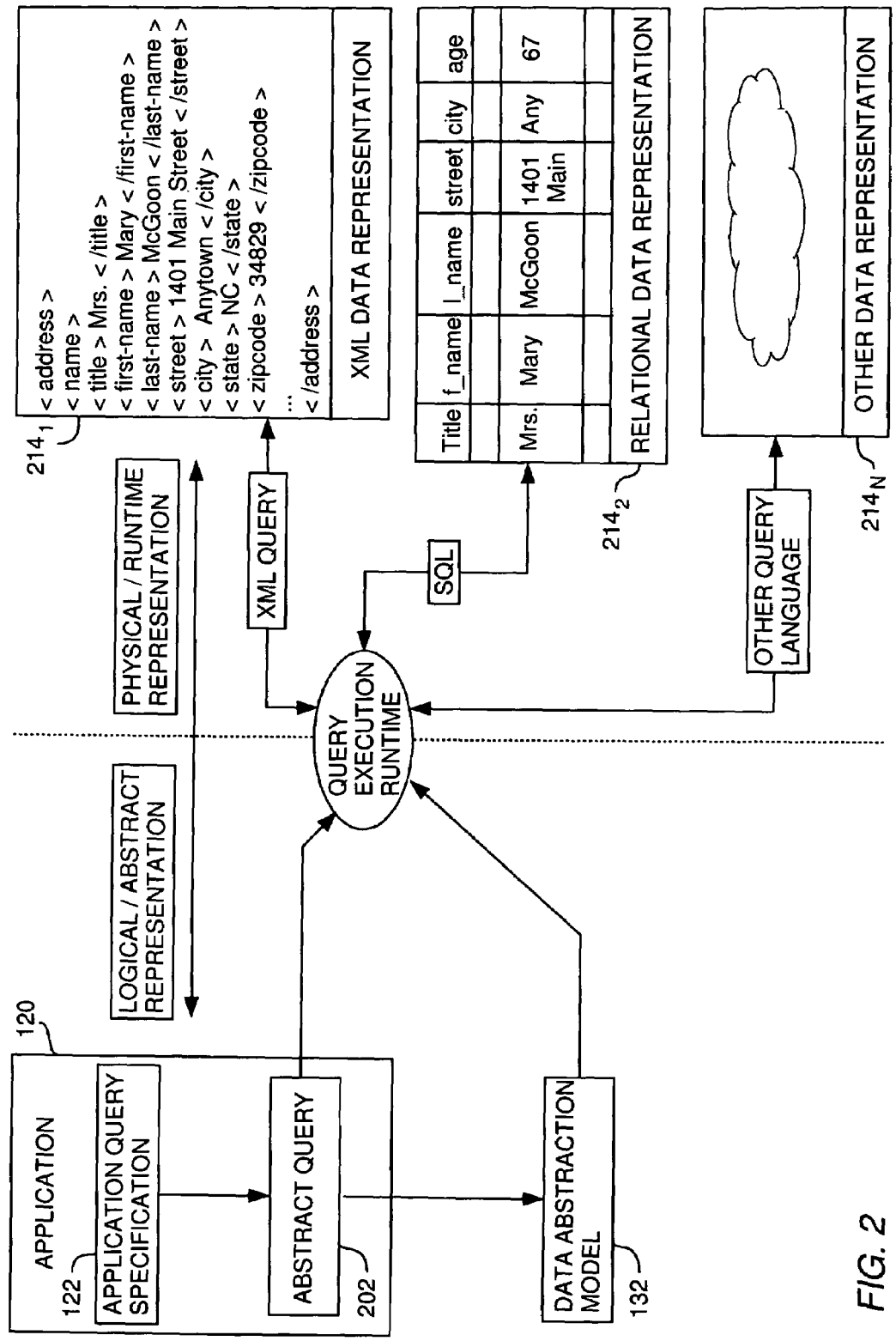
FIGS. 2-3 are relational views of software components in one embodiment.
Figure 3:
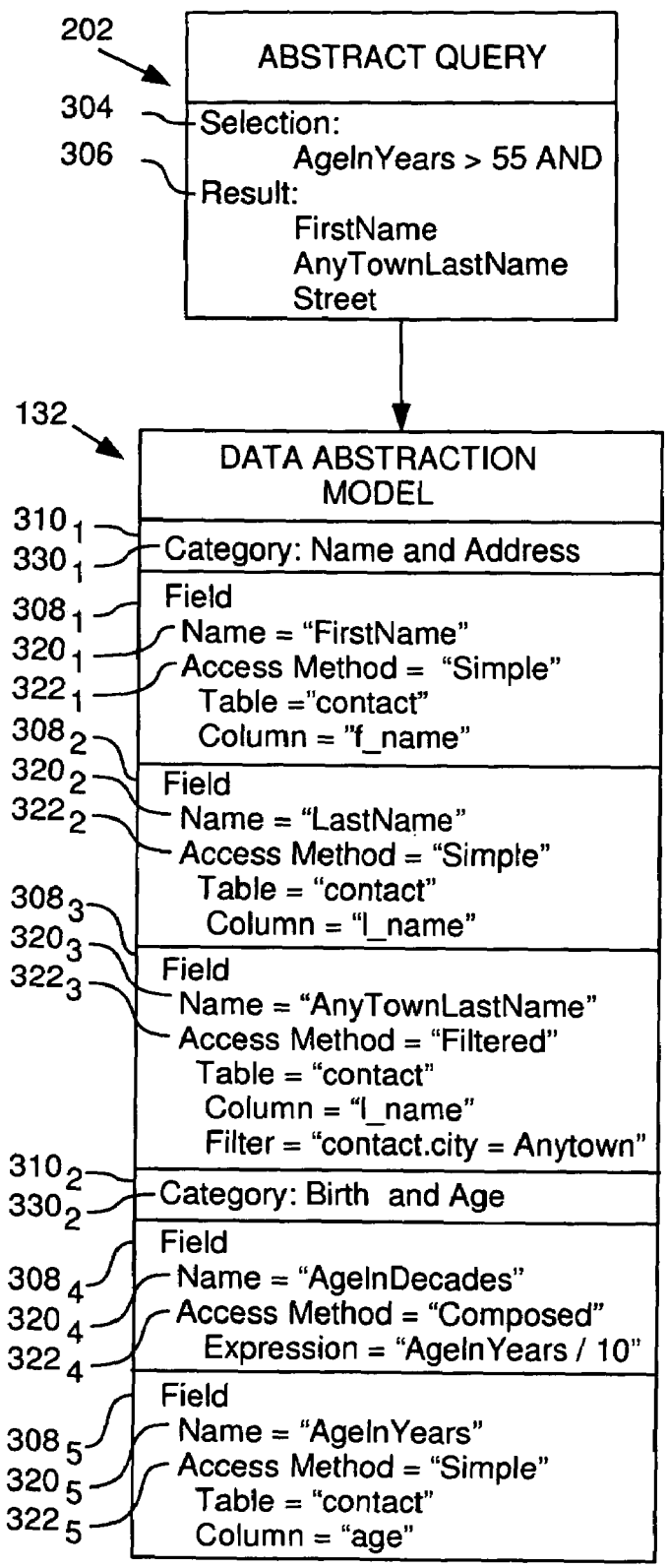

FIGS. 2-3 show an illustrative relational view of the applications 120, the application query specifications 122 and the data abstraction model 132 of FIG. 1 and other components of the invention. A requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 122 may include both criteria used for data selection (selection criteria 304) and an explicit specification of the fields to be returned (return data specification 306) based on the selection criteria 304, as illustrated in FIG. 3.

As was noted above, the logical fields specified by the application query specification 122 and used to compose the abstract query 202 are defined by the data abstraction model 132. In general, the data abstraction model 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in a corresponding database (e.g., database 139 of FIG. 1), thereby allowing queries to be formed that are loosely coupled to the underlying data representation.

In one embodiment, illustrated in FIG. 3, the data abstraction model 132 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139 of FIG. 1). As illustrated in FIG. 2, the access methods associate the logical field names to a particular physical data representation $214_1$, $214_2$, ... $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 132 contains field specifications (with associated access methods) for two or more physical data representations 214. In an alternative embodiment, a different single data abstraction model 132 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

| 001 | <?xml version="1.0"?> |
| 002 | <!--Query string representation: (AgeInYears > "55"--> |
| 003 | <QueryAbstraction> |
| 004 |   <Selection> |
| 005 |     <Condition internalID="4"> |
| 006 |       <Condition field="AgeInYears" operator="GT" value="55" |
| 007 |         internalID="1"/> |
| 008 |   </Selection> |
| 009 |   <Results> |
| 010 |     <Field name="FirstName"/> |
| 011 |     <Field name="AnyTownLastName"/> |
| 012 |     <Field name="Street"/> |
| 013 |   </Results> |
| 014 | </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

| 001 | <?xml version="1.0"?> |
| 002 | <DataAbstraction> |
| 003 |   <Category name="Name and Address"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |     </Field> |
| 009 |     <Field queryable="Yes" name="LastName" displayable="Yes"> |
| 010 |       <AccessMethod> |
| 011 |         <Simple columnName="l_name" tableName="contact"></Simple> |
| 012 |       </AccessMethod> |
| 013 |     </Field> |
| 014 |     <Field queryable="Yes" name="AnyTownLastName" displayable="Yes"> |
| 015 |       <AccessMethod> |
| 016 |         <Filter columnName="l_name" tableName="contact"> |
| 017 |   </Filter="contact.city=Anytown"> |
| 018 |       </AccessMethod> |
| 019 |     </Field> |
| 020 |   </Category> |
| 021 |   <Category name="Birth and Age"> |
| 022 |     <Field queryable="Yes" name="AgeInDecades" displayable="Yes"> |
| 023 |       <AccessMethod> |
| 024 |         <Composed columnName="age" tableName="contact"> |
| 025 |   </Composed Expression="columnName/10"> |
| 026 |       </AccessMethod> |
| 027 |     </Field> |
| 028 |     <Field queryable="Yes" name="AgeInYears" displayable="Yes"> |
| 029 |       <AccessMethod> |
| 030 |         <Simple columnName="age" tableName="contact"></Simple> |
| 031 |       </AccessMethod> |
| 032 |     </Field> |
| 033 |   </Category> |
| 034 | </DataAbstraction> |

By way of example, note that lines 004-008 correspond to the first field specification $308_1$, of the DAM 132 shown in FIG. 3 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 4-5.

Transforming an Abstract Query Into a Concrete Query

Figure 4:
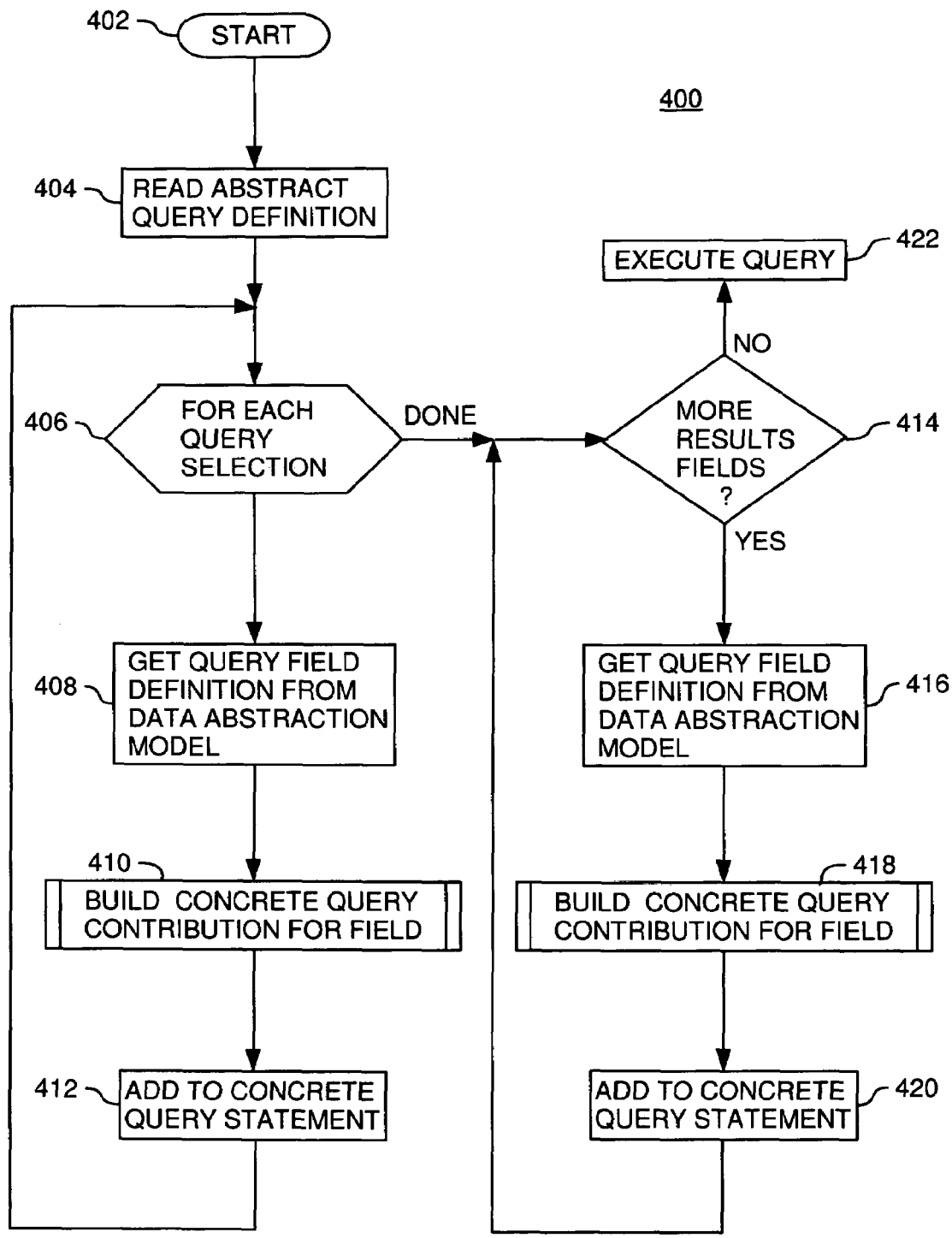
FIGS. 4-5 are flow charts illustrating the operation of a query builder component.

Referring now to FIG. 4, an illustrative runtime method 400 exemplifying one embodiment of the operation of the query builder component 150 of FIG. 1 is shown. The method 400 is entered at step 402 when the query builder component 150 receives as input an abstract query (such as the abstract query shown in Table I). At step 404, the query builder component 150 reads and parses the abstract query and locates individual selection criteria and desired result fields. At step 406, the query builder component 150 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the query builder component 150 uses the field name from a selection criterion of the abstract query to look up the definition of the field in the data abstraction model 132. As noted above, the field definition includes a definition of the access method used to access the data structure associated with the field. The query builder component 150 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the query builder component 150 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the query builder component 150 looks up a result field name (from the result specification of the abstract query) in the data abstraction model 132 and then retrieves a result field definition from the data abstraction model 132 to identify the physical location of data to be returned for the current logical result field. The query builder component 150 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
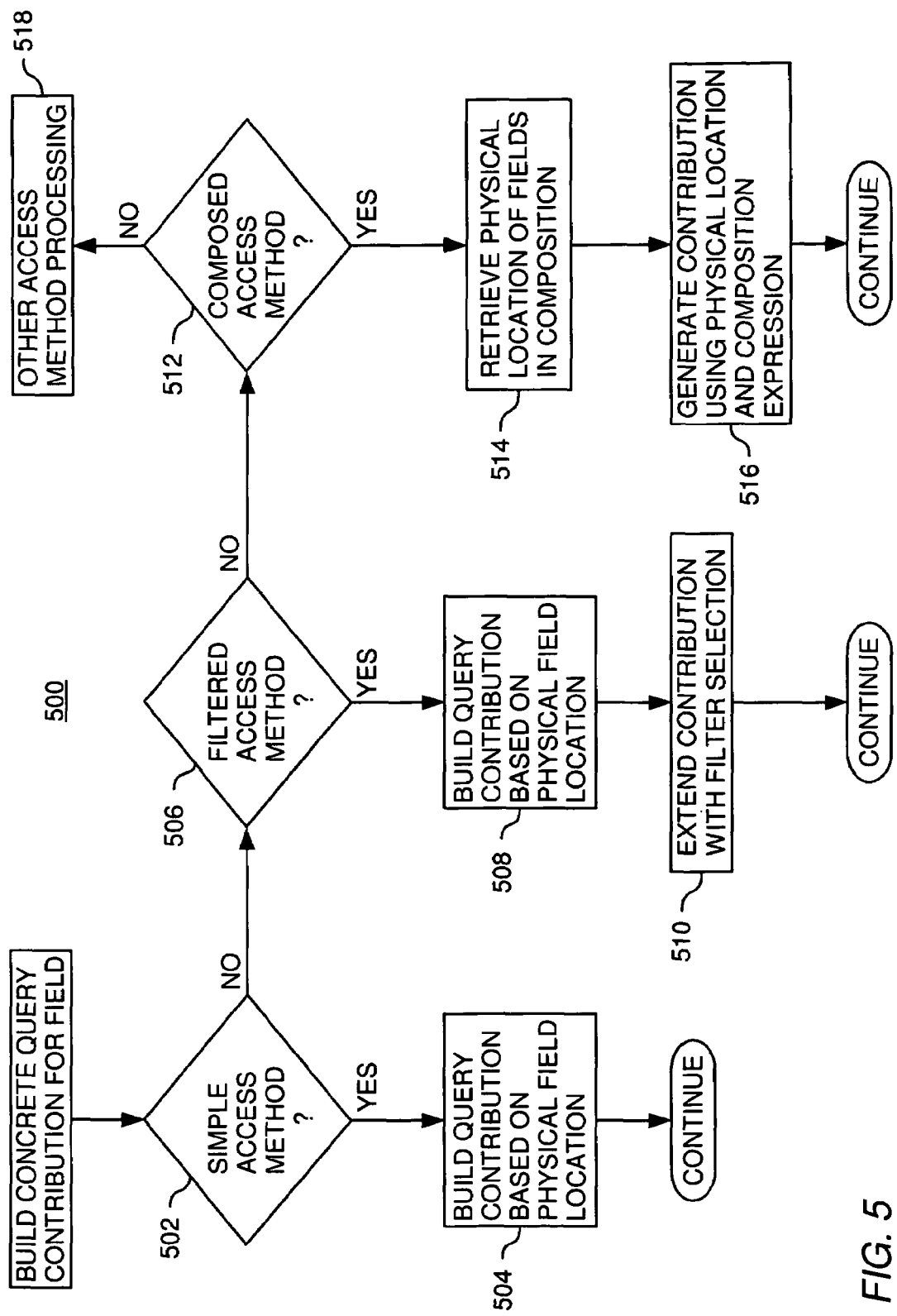

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Rebinding Abstract Queries

Figure 6:
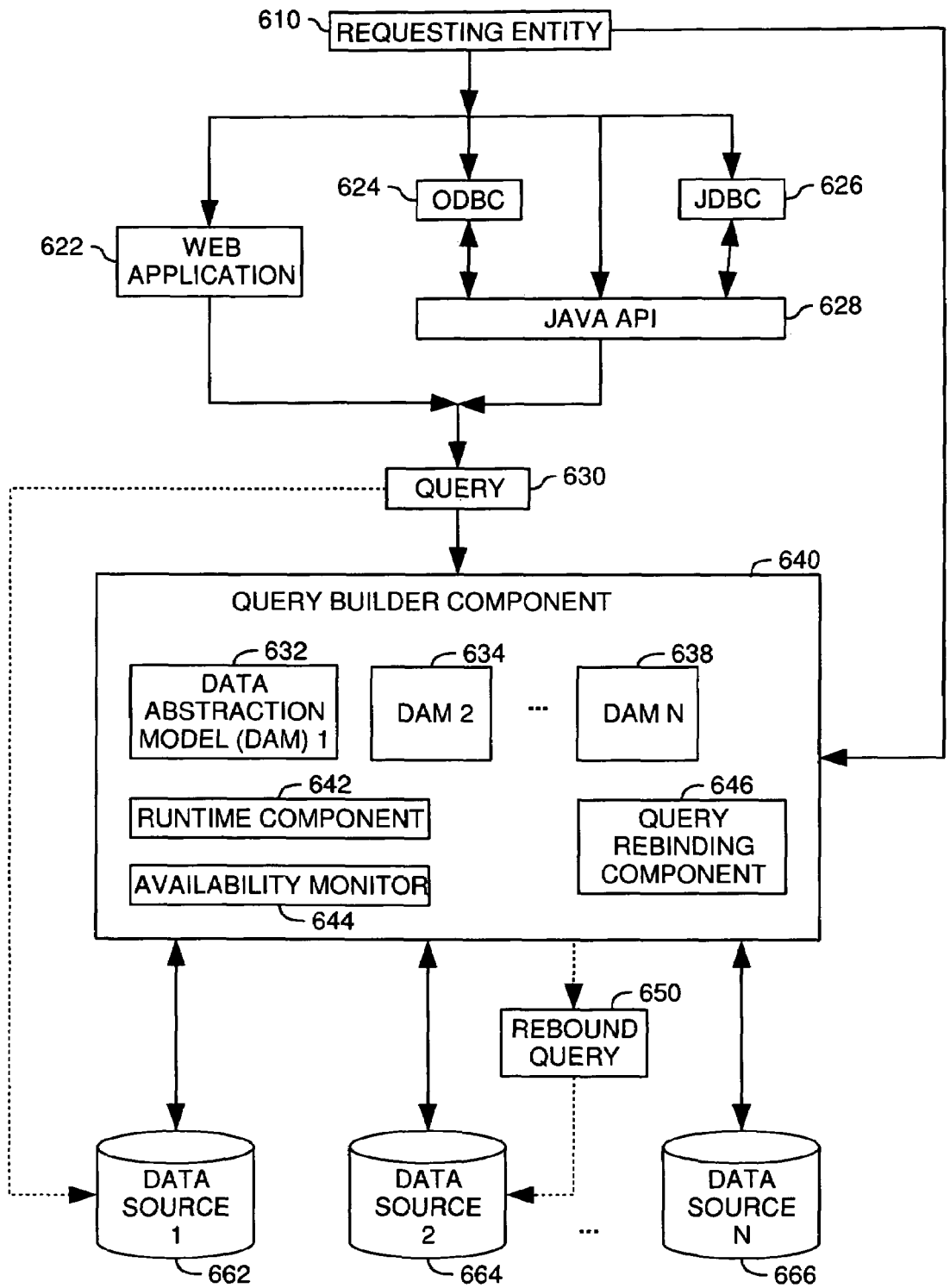
FIG. 6 is a relational view of software components in one embodiment.

Referring now to FIG. 6, a relational view of components implementing one aspect of the invention is illustrated. The components illustratively include a requesting entity 610 (e.g., application(s) 120 of FIG. 1), a plurality of database connectivity tools 622, 624, 626 and 628, a query builder component 640 (e.g., query builder component 150 of FIG. 1), and data sources 662, 664 and 666 (e.g., databases 139 and 164 of FIG. 1).

The query builder component 640 includes a plurality of elements which implement constituent functions of the query builder component 640. Illustratively, these elements include data abstraction models 632, 634 and 638 (e.g., data abstraction models 132 of FIG. 1), a runtime component 642, an availability monitor 644 and a query rebinding component 646. However, it should be noted that one or more of these elements can also be implemented as separate components. For instance, the data abstraction models 632, 634 and 638 can be implemented as separate software components as shown in FIG. 1.

By way of example, each of the data abstraction models 632, 634 and 638 is associated with a corresponding data source of the data sources 662, 664 and 666. More specifically, the data abstraction model 632 "DAM 1" abstractly describes the data source 662 "DATA SOURCE 1", the data abstraction model 634 "DAM 2" abstractly describes the data source 664 "DATA SOURCE 2", and the data abstraction model 638 "DAM N" abstractly describes the data source 666 "DATA SOURCE N". Alternatively, as was noted above, all or at least a portion of the data sources 662, 664, 666 can be abstractly described by a common data abstraction model. In this case, the common data abstraction model can be divided into a plurality of sections, where each section abstractly describes (e.g., in the form of field names and access methods) an associated data source.

The requesting entity 610 can be any entity which is suitable to issue queries against the data sources 662, 664 and 666, including suitable applications (e.g., applications 120 of FIG. 1), an operating system (e.g., operating system 118 of FIG. 1) and, at the highest level, users. Illustratively, the requesting entity 610 issues a query 630 against the data source 662 "DATA SOURCE 1" (as illustrated by dashed arrow 636). To this end, the requesting entity 610 accesses one of the database connectivity tools 622, 624, 626 or 628 for creation of the query 630. Illustratively, the database connectivity tools 622, 624, 626 and 628 include a Web application 622, an Open DataBase Connectivity (ODBC) driver 624, a Java DataBase Connectivity (JDBC) driver 626 and a Java Application Programming Interface (Java API) 628. The Web application 622 is an application that is accessible by a Web browser and that provides some function beyond static display of information, for instance by allowing the requesting entity 610 to query the data source 662. The ODBC driver 624 is a driver that provides a set of standard application programming interfaces to perform database functions such as connecting to the data source 662, performing dynamic SQL functions, and committing or rolling back database transactions. The JDBC driver 626 is a program included with a database management system (e.g., DBMS 154 of FIG. 1) to support JDBC standard access between the data source 662 and Java applications. The Java API 628 is a Java-based interface that allows an application program (e.g., the requesting entity 610, the ODBC 624 or the JDBC 626) that is written in a high-level language to use specific data or functions of an operating system (e.g., operating system 118 of FIG. 1) or another program (e.g., the query builder component 640).

In one embodiment, the query 630 is received by the query builder component 640 in an abstract form. For instance, the query 630 is received through the ODBC 624, the JDBC 626 or the Java API 628 and references logical fields which are defined by the data abstraction model which abstractly defines the physical data in the data source 662 "DATA SOURCE 1", i.e., the data abstraction model 632 "DAM 1". In this case, the query 630 can be in an "SQL-like" form where the logical fields are referenced using SQL, but without including other conventional SQL grammar, such as join logic. In another embodiment, the query builder component 640 receives the query 630 in physical form and transforms this query into an abstract query (e.g., abstract query 202 of FIGS. 2-3). In this case, the query 630 is a physical query such as an SQL query which is transformed into the abstract form. This transformation can be performed using embodiments described in U.S. patent application Ser. No. 11/016,201 filed on Dec. 17, 2004, entitled "TRANSFORMATION OF A PHYSICAL QUERY INTO AN ABSTRACT QUERY".

However, it should be noted that in one embodiment the requesting entity 610 can directly access the query builder component 640 to compose the abstract query. Furthermore, the query 630 can already be an existing abstract query which is, for instance, retrieved from storage.

As was noted above, in the given example the query 630 is issued against the data source 662 "DATA SOURCE 1" and, thus, refers to the logical fields which are defined by the data abstraction model 632 "DAM 1". By way of example, assume that the data source 662 "DATA SOURCE 1" defines a data warehouse that contains information about customer orders which have been received by a given company. An exemplary data source having three database tables is illustrated in Table III below. For simplicity, the exemplary database tables are represented in a shorthand format. Further, for brevity, only parts that are relevant for the following explanations are shown.

TABLE III

| DATA SOURCE 1 EXAMPLE | |
|---|---|
| 001 | BUYERINFO |
| 002 | ID |
| 003 | ADDRESS |
| 004 | NAME |
| 005 | ORDERINFO |
| 006 | ID |
| 007 | DATE |
| 008 | BUYERID |
| 009 | ORDERITEMS |
| 010 | ID |
| 011 | DESCRIPTION |
| 012 | ORDERID |

It should be noted that the exemplary data source illustrated in Table III includes three database tables: (i) a BuyerInfo table (lines 001-004) containing information about customers (ii) an OrderInfo table (lines 005-008) containing information used to identify orders, and (iii) an OrderItems table (lines 009-012) containing information about ordered items. Each of these three database tables illustratively includes three columns. More specifically, the BuyerInfo table includes an ID column (line 002), an Address column (line 003), and a Name column (line 004). The OrderInfo table includes an ID column (line 006), an OrderDate column (line 007), and a BuyerID column (line 008). The OrderItems table includes an ID column (line 010), a Description column (line 011), and an OrderID column (line 012).

As was noted above, the data source 662 "DATA SOURCE 1" is abstractly described by the data abstraction model 632 "DAM 1". Table IV, below, illustrates a possible structure of the data abstraction model 632 "DAM 1". For simplicity, elements of the data abstraction model are represented in a shorthand format. Persons skilled in the art will readily recognize corresponding XML representations. Further, for brevity, only parts that are relevant for the following explanations are shown. It is noted that this manner of presentation applies to other tables described below as well.

TABLE IV

| DAM1 EXAMPLE | | | |
|---|---|---|---|
| 001 | Buyer | | |
| 002 | | +--> Buyer ID | → BUYERINFO.ID |
| 003 | | +--> Name | → BUYERINFO.NAME |
| 004 | | +--> Address | → BUYERINFO.ADDRESS |
| 005 | Order | | |
| 006 | | +--> Order ID | → ORDERINFO.ID |
| 007 | | +--> Order Date | → ORDERINFO.DATE |
| 008 | Order Items | | |
| 009 | | +--> Item ID | → ORDERITEMS.ID |
| 010 | | +--> Description | → ORDERITEMS.DESCRIPTION |

As can be seen from lines 001, 005 and 008, the exemplary data abstraction model includes three categories (shown on the far left hand side), i.e., "Buyer", "Order" and "Order Items". Each category includes logical fields (each prefixed by "+-->") which are illustratively associated with an access method. By way of example, the "Buyer" category includes a logical field "Buyer ID" (line 002) which is associated (as illustrated by an arrow "→") with an access method which links the "Buyer ID" field to the ID column of the BUYERINFO table in the exemplary data source of Table III ("BUYERINFO.ID" in line 002).

Assume now that the abstract query illustrated in Table V below is issued against the data source 662 "DATA SOURCE 1" of Table III. For simplicity, the exemplary abstract query of Table V is illustrated in natural language. Persons skilled in the art will readily recognize corresponding XML representations, such as used to describe the exemplary abstract query of Table I. However, it should be noted that implementation of the exemplary abstract query is not limited to a particular machine-readable language and that an implementation in any machine-readable language, known or unknown, is broadly contemplated.

TABLE V

| ABSTRACT QUERY EXAMPLE | |
|---|---|
| 001 | FIND |
| 002 | Order ID, Name |
| 003 | WHERE |
| 004 | Order Date > August 2004 AND |
| 005 | Order Date < November 2004 |

It should be noted that the abstract query of Table V is configured to identify from the data source 662 "DATA SOURCE 1" a list of order identifiers ("Order ID" in line 002) and corresponding customer names ("Name" in line 002) for all customer orders which have been received by the given company between September 2004 ("Order Date>August 2004" in line 004) and October 2004 ("Order Date<November 2004" in line 005). The order identifiers and the customer names define result fields and the Order Date defines a condition field of the abstract query, all of which relate to corresponding logical fields in the exemplary data abstraction model of Table IV. By way of example, the result field "Order ID" (line 002 of Table V) relates to the "Order ID" field in line 006 of the exemplary data abstraction model of Table IV.

In response to creating/receiving the exemplary abstract query of Table V, the query builder component 640 determines whether the abstract query is configured for retrieving data from the data source 662 "DATA SOURCE 1". If so, the availability monitor 644 determines the status of the data source 662 "DATA SOURCE 1". Dependent on the status of the data source 662 "DATA SOURCE 1", the query rebinding component 646 may rewrite the abstract query for execution against another data source, if the other data source contains at least a portion of the physical data contained in the data source 662 "DATA SOURCE 1".

Assume now that the data source 664 "DATA SOURCE 2" defines an operational data store which contains all information about customer orders which is available by the data warehouse defining the data source 662 "DATA SOURCE 1". An exemplary data source representing the data source 664 "DATA SOURCE 2" having a single database table is illustrated in Table VI below by way of example. For simplicity, the exemplary database table is represented in a shorthand format. Further, for brevity, only parts that are relevant for the following explanations are shown.

TABLE VI

| DATA SOURCE 2 EXAMPLE | |
|---|---|
| 001 | ENTRYINFO |
| 002 | BUYERID |
| 003 | ADDRESS |
| 004 | NAME |
| 005 | ORDERID |
| 006 | ORDERDATE |
| 007 | ITEMID |
| 008 | DESCRIPTION |

It should be noted that the exemplary data source illustrated in Table VI includes a single EntryInfo database table (lines 001-008) containing: (i) information about customers (lines 002-004), (ii) information used to identify orders (lines 005-006), and information about ordered items (lines 007-008). Specifically, the EntryInfo database table includes seven columns. More specifically, the EntryInfo table includes an ID column (line 002), an Address column (line 003), a Name column (line 004), an OrderID column (line 005), an OrderDate column (line 006), an ItemID column (line 007), and a Description column (line 008). In the given example, the ID column (line 002) corresponds to the ID column in line 002 of Table III, the Address column (line 003) corresponds to the Address column in line 003 of Table III, the Name column (line 004) corresponds to the Name column in line 004 of Table III, the OrderID column (line 005) corresponds to the ID column in line 006 of Table III, the OrderDate column (line 006) corresponds to the Date column in line 007 of Table III, the ItemID column (line 007) corresponds to the ID column in line 010 of Table II, and the Description column (line 008) corresponds to the Description column in line 011 of Table III.

As was noted above, the data source 664 "DATA SOURCE 2" is abstractly described by the data abstraction model 634 "DAM 2". As an example of the data abstraction model 634 "DAM 2", the exemplary data abstraction model "DAM2" shown in Table VII below is illustrated. For simplicity, elements of the data abstraction model are represented in a shorthand format. Persons skilled in the art will readily recognize corresponding XML representations. Further, for brevity, only parts that are relevant for the following explanations are shown.

TABLE VII

| DAM2 EXAMPLE | | |
|---|---|---|
| 001 | Buyer | |
| 002 | +---> Customer Identifier | → ENTRYINFO.BUYERID |
| 003 | +---> Customer Name | → ENTRYINFO.NAME |
| 004 | +---> Customer Address | → ENTRYINFO.ADDRESS |
| 005 | Order | |
| 006 | +---> Order Number | → ENTRYINFO.ORDERID |
| 007 | +---> Order Date | → ENTRYINFO.ORDERDATE |
| 008 | Order Items | |
| 009 | +---> Item Number | → ENTRYINFO.ITEMID |
| 010 | +---> Item Description | → ENTRYINFO.DESCRIPTION |

As can be seen from lines 001, 005 and 008, the exemplary data abstraction model includes three categories, i.e., "Buyer", "Order" and "Order Items". Furthermore, each category includes logical fields which are illustratively associated with an access method. By way of example, the "Buyer" category includes a logical field "Customer Identifier" (line 002) which is associated (as illustrated by an arrow "→") with an access method which links the "Customer Identfier" field to the BUYERID column of the ENTRYINFO table in the exemplary data source of Table VI ("ENTRYINFO.BUYERID" in line 002).

In order to enable execution of the abstract query against the data source 664 "DATA SOURCE 2", the abstract query of Table V must be modified, since the abstract query was originally written to retrieve data from data source 662

"DATA SOURCE 1" of Table II, and since data source 662 "DATA SOURCE 1" and data source 664 "DATA SOURCE 2" are structured differently. Therefore, the abstract query must be modified with respect to the data abstraction model 634 "DAM 2" which abstractly describes the data source 664 "DATA SOURCE 2".

Illustratively, the abstract query is rewritten into a rebound abstract query 650. In other words, the query rebinding component 646 transforms the abstract query, which is consistent with the data abstraction model 632 "DAM 1", into the rebound abstract query 650, which is consistent with the data abstraction model 634 "DAM 2". The rebound abstract query 650 can be transformed into a concrete query by the runtime component 642 and executed against the data source 664 "DATA SOURCE 2". In one embodiment, rewriting/transforming the abstract query into the rebound abstract query 650 includes creating the rebound abstract query 650 on the basis of the abstract query. An exemplary method for creation of a rebound abstract query on the basis of an original abstract query is described in more detail below with reference to FIGS. 7-8.

Figure 7:
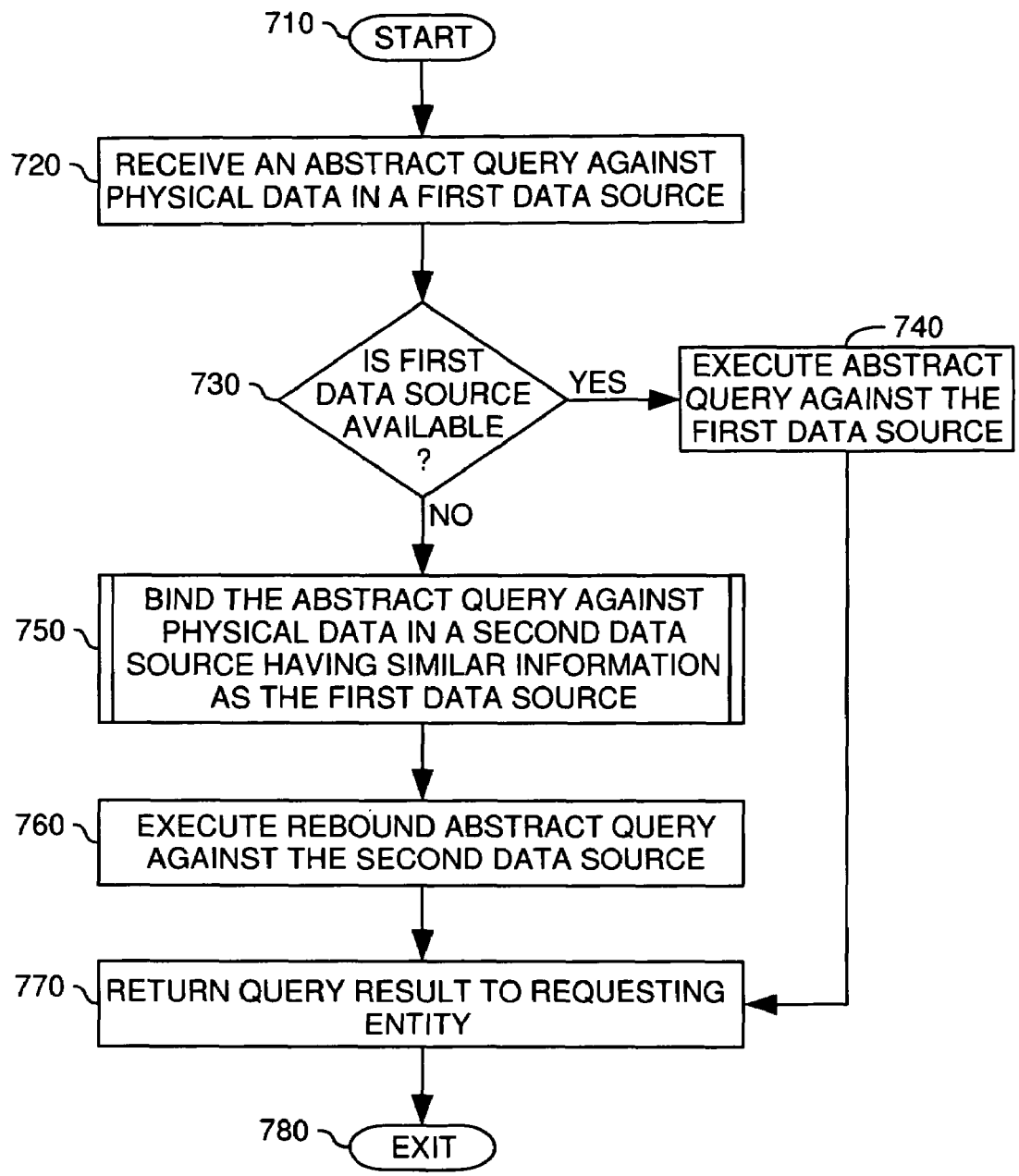
FIG. 7 is a flow chart illustrating query execution management in one embodiment.

Referring now to FIG. 7, an exemplary method 700 for managing execution of an abstract query (e.g., abstract query 202 of FIGS. 2-3) is illustrated. In one embodiment, at least a portion of the steps of method 700 is performed using a suitable query builder component (e.g., query builder component 640 of FIG. 6). Method 700 starts at step 710.

At step 720, an abstract query against physical data in a first data source (e.g., data source 662 of FIG. 6) is received from a requesting entity (e.g., requesting entity 610 of FIG. 6). By default configuration, the abstract query is configured to obtain requested data from the first data source. Furthermore, the abstract query is specified using logical fields of a first data abstraction model (e.g., data abstraction model 632 of FIG. 6) which abstractly describes the physical data in the first data source.

It should be noted that receiving the abstract query includes receiving a query in an "SQL-like" abstract form or a non-abstract query (e.g., query 630 of FIG. 6) and transforming the non-abstract query into the abstract query, as described above with reference to FIG. 6. Furthermore, receiving the abstract query includes, in one embodiment, determining that the abstract query is issued against the first data source.

At step 730, it is determined whether the first data source is available. This determination can be performed using a suitable availability monitor (e.g., availability monitor 644 of FIG. 6). However, it should be noted that any suitable technique for determining the status of the first data source, known or unknown, is broadly contemplated.

If the first data source is available, the abstract query is transformed into a concrete query and executed against the first data source at step 740. Transforming the abstract query into the concrete query can be performed using a suitable runtime component (e.g., runtime component 642 of FIG. 6) according to the exemplary methods which are described above with reference to FIGS. 4-5. Processing then continues at step 770 as described below.

If, however, the first data source is unavailable, the abstract query is rebound against a second data abstraction model abstractly describing physical data in a second data source (e.g., data source 664 of FIG. 6) having similar information as the first data source, at step 750. More specifically, if the first data source is unavailable, a determination can be performed at step 750 in order to determine whether any available data source contains at least a portion of the physical data contained in the first data source and/or at least a portion of the requested data. This determination can be performed using any suitable, known or unknown, technique including, by way of example, look-up tables. Accordingly, any suitable technique is broadly contemplated.

Assume now that the first data source defines the data warehouse of Table III and that the second data source defines the operational data store of Table VI, which contains all queryable data contained in the data warehouse. Accordingly, it can be determined at step 750 that the second data source contains the physical data of the first data source and, thus, the abstract query can be rebound to the second data source. An exemplary method for rebinding the abstract query to the second data source is described in more detail below with reference to FIG. 8. A corresponding rebound abstract query is accordingly specified using logical fields of a second data abstraction model (e.g., data abstraction model 634 of FIG. 6) which abstractly describes the physical data in the second data source.

At step 760, the rebound abstract query (e.g., rebound abstract query 650 of FIG. 6) is transformed into a concrete query and executed against the second data source to obtain a corresponding query result. Transforming the rebound abstract query into the concrete query can be performed using a suitable runtime component (e.g., runtime component 642 of FIG. 6) according to the exemplary methods which are described above with reference to FIGS. 4-5.

At step 770, the query result is returned to the requesting entity. Method 700 then exits at step 780.

Figure 8:
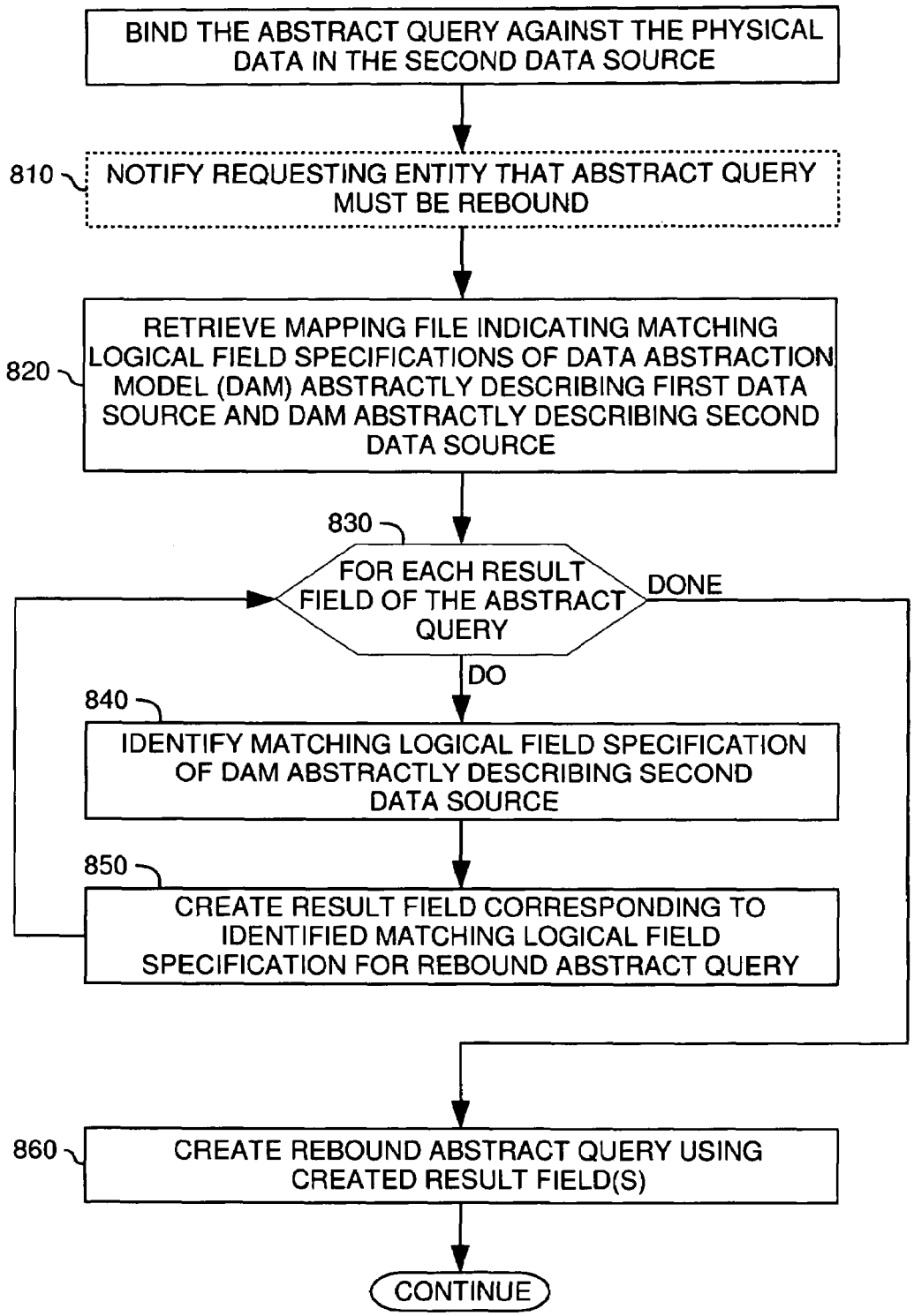
FIG. 8 is a flow chart illustrating rebinding of an abstract query in one embodiment.

Referring now to FIG. 8, an exemplary method 800 for creation of a rebound abstract query (e.g., rebound abstract query 650 of FIG. 6) on the basis of an original abstract query (e.g., abstract query 202 of FIGS. 2-3) is illustrated. According to one aspect, method 800 is entered from step 750 of method 700 of FIG. 7. At least a portion of the steps of method 800 is performed using a suitable query builder component (e.g., query builder component 640 of FIG. 6).

Method 800 starts at step 810, where the requesting entity is notified that the first data source is unavailable and that the abstract query needs to be rebound against the second data source to obtain at least a portion of the requested data. However, it should be noted that step 810 is merely optional. Instead, the query builder component can be configured to rebind the abstract query automatically against the second data source if the first data source is unavailable. In this case, method 800 starts at step 820 as described below.

In one embodiment, notifying the requesting entity includes prompting the requesting entity to indicate whether the abstract query should be rebound against the second data source and/or to grant permission for use of the second data source. According to one aspect, the notification may include some disclaimer information indicating that the rebound abstract query may require a longer execution time so as not to affect the performance of the second data source. The disclaimer information may further indicate that the information returned from the second data source can be slightly different from the information that is obtainable from the first data source as the second data source may have more information than the first data source, so that the rebound abstract query may return more results. Furthermore, in one embodiment notifying the requesting entity includes prompting the requesting entity to select one of a plurality of data sources against which the abstract query should be rebound.

If the requesting entity indicates that the abstract query should not be rebound and/or denies permission for use of the second data source, the abstract query is not rebound against the second data source. In this case, rebinding the abstract query according to method 800 can be terminated and a corresponding notification can be issued to the requesting entity. In one embodiment, if the rebinding is terminated, processing immediately returns to step 780 of method 700, where method 700 exits.

If the rebinding of the abstract query is requested by the requesting entity or if the rebinding is performed automatically, predefined mappings between the first and second data abstraction models are retrieved or generated. According to one aspect, such mappings are provided with the query rebinding component. However, the mappings can alternatively be stored as a persistent data object in storage, e.g., as a suitable mapping file. In one embodiment, the mappings are generated using a metaDAM. Generally, a metaDAM defines relationships between corresponding fields in two or more DAMs. For example, a metaDAM may specify that Logical_$_{Field}$_1 of DAM 1 corresponds to Logical_Field_5 of DAM2 , where Logical_Field_1 may be Buyer ID and Logical_Field_2 may be Customer Identifier. In other words, the metaDAM contains mappings between counterpart fields in different DAMs. Accordingly, the metaDAM can be accessed to identify corresponding fields between two or more DAMs. In one embodiment, this identification can be performed at runtime so that only identification is done only with respect to fields contained in a given query being processed. Alternatively, a mapping file can be created prior to runtime that contains all mappings between two or more DAMs. The mapping file is then accessed at runtime for a given query being processed. Embodiments of metaDAMs that may be used to advantage are described in U.S. patent application Ser. No. 10/955,467, filed on Sep. 30, 2004, entitled "METADATA MANAGEMENT FOR A DATA ABSTRACTION MODEL". All such different implementations are broadly contemplated.

In the given example, the mapping file includes mappings between the exemplary data abstraction model "DAM1" shown in Table IV and the exemplary data abstraction model "DAM2" shown in Table VII. An exemplary mapping file including the mappings of the given example is illustrated in Table VIII below. For simplicity, elements of the mapping file are represented in a shorthand format. Specifically, for brevity, only parts that are relevant for the following explanations are shown.

TABLE VIII

MAPPINGS EXAMPLE

| | |
|---|---|
| 001 | Buyer/Buyer ID = Buyer/Customer Identifier |
| 002 | Buyer/Name = Buyer/Customer Name |
| 003 | Buyer/Address = Buyer/Customer Address |
| 004 | Order/Order ID = Order/Order Number |
| 005 | Order/Order Date = Order/Order Date |
| 006 | Order Items/Item ID= Order Items/Item Number |
| 007 | Order Items/Description = Order Items/Item Description |

As can be seen from Table VIII, the exemplary mapping file maps each logical field of the exemplary data abstraction model "DAM1" of Table IV to a corresponding logical field of the exemplary data abstraction model "DAM2" of Table VII. By way of example, it can be seen from line 001 that the exemplary mapping file maps the "Buyer ID" field of the exemplary data abstraction model "DAM1" (line 002 of Table IV) to the "Customer Identifier" field of the exemplary data abstraction model "DAM2" (line 002 of Table VII).

However, it should be noted that the exemplary mapping file of Table VIII is merely illustrated by way of example and that other implementations are contemplated. Specifically, the granularity of mappings can be adapted as required. For instance, the mapping illustrated in line 001 of Table VIII may be defined as: "Buyer/Buyer ID=substring (Buyer/Customer Identifier, 1, 20)". In this case, only a substring consisting of characters "1" to "20" of the identifier defined by the logical field "Customer Identifier" maps to the identifier as defined by the logical field "Buyer ID".

At step 830, a loop consisting of steps 830, 840 and 850 is entered for each result field and each condition field which is referred to in the abstract query. For simplicity, the loop only refers to and is only explained by way of example with respect to result fields. More specifically, at step 830 the loop is entered for a first result field of the abstract query. Assume now that, in the given example, the loop is initially entered for the result field "Order ID" (line 002 of Table V), which is defined by the exemplary data abstraction model of Table IV.

At step 840, a matching logical field of the exemplary data abstraction model of Table VIII is identified from the mapping file, i.e., the exemplary mapping file of Table VIII. In the given example, the matching logical field for the "Order ID" field is the "Order Number" field of the exemplary data abstraction model of Table VII (line 004 of Table VIII). At step 850, a result field corresponding to the matching logical field, i.e., the "Order Number" field, is added to the rebound abstract query.

When the loop consisting of steps 830, 840 and 850 has been performed for each result field and each condition field, processing continues at step 860. At step 860, the rebound abstract query is created using the added result and condition fields. In the given example, the exemplary rebound abstract query illustrated in Table IX below is obtained. For simplicity, the exemplary rebound abstract query of Table IX is illustrated in natural language. Persons skilled in the art will readily recognize corresponding XML representations, such as used to describe the exemplary abstract query of Table I. However, it should be noted that implementation of the exemplary abstract query is not limited to a particular machine-readable language and that an implementation in any machine-readable language, known or unknown, is broadly contemplated.

TABLE IX

REBOUND ABSTRACT QUERY EXAMPLE

| | |
|---|---|
| 001 | FIND |
| 002 | Order Number, Customer Name |
| 003 | WHERE |
| 004 | Order Date > August 2004 AND |
| 005 | Order Date < November 2004 |

By way of example, it should be noted that the result field "Name" in line 002 of the abstract query of Table V has been rebound to the logical field "Customer Name" (line 002 of the exemplary data abstraction model of Table VII) according to line 002 of the exemplary mapping file of Table VIII. Furthermore, it should be noted that according to lines 004-005 the condition field "Order Date" of the abstract query of Table V has been rebound to the logical field "Order Date" (line 007 of the exemplary data abstraction model of Table VII) according to line 005 of the exemplary mapping file of Table VIII.

Processing then continues according to method 700 as described above.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method for managing execution of queries querying physical data logically represented by a data abstraction model stored in a memory coupled to a processor, comprising:
 receiving a first abstract query against physical data in a first data source, the first abstract query having one or more result fields configured to return requested data from the first data source, each result field having a corresponding logical field specification of a first data abstraction model stored in the memory, wherein each corresponding logical field specification describes an access method for accessing physical data in the first data source;
 in response to receiving the first abstract query and determining that the first abstract query is configured for retrieving data from the first data source, detecting whether the first data source is available; and
 upon detection that the first data source is unavailable:
  creating, on the basis of the first abstract query, a second abstract query against physical data in a second data source containing at least a portion of the requested data, the second abstract query having one or more result fields configured to return at least the portion of the requested data from the second data source, each result field of the second abstract query having a corresponding logical field specification of a second data abstraction model stored in the memory abstractly describing the second data source, wherein each corresponding logical field specification describes an access method for accessing physical data in the second data source; wherein creating the second abstract query comprises:
   for each result field of the first abstract query:
    identifying a matching logical field specification in the second data abstraction model by accessing predefined mappings describing matching logical field specifications of the first data abstraction model and the second data abstraction model; and
    adding a result field corresponding to the matching logical field specification to the second abstract query; and
  executing the second abstract query against the second data source to obtain at least the portion of the requested data.

2. The method of claim 1, wherein the first and second data abstraction models are one of:
 (i) part of a common data abstraction model; and
 (ii) separate data abstraction models.

3. The method of claim 1, wherein the first and second data sources describe similar information using differently structured data structures, wherein the differently structured data structures include at least one of:
 (i) different database schemas;
 (ii) different database tables; and
 (iii) database tables having different columns.

4. The method of claim 3, wherein the first data source defines a data warehouse having queryable data and the second data source defines an operational data store; wherein the operational data store contains all of the queryable data contained in the data warehouse.

5. The method of claim 1, further comprising, before creating the second abstract query:
 notifying a requesting entity issuing the first abstract query that the first data source is unavailable.

6. The method of claim 5, further comprising:
 prompting the requesting entity to indicate whether creation of the second abstract query is requested; wherein the second abstract query is only created if the creation is requested.

7. The method of claim 1, further comprising, before creating the second abstract query:
 notifying a requesting entity issuing the first abstract query that the first data source is unavailable; and
 requesting, from the requesting entity, a permission to use the second data source to determine at least the portion of the requested data; wherein the second abstract query is only created if the permission is granted.

8. A computer-implemented method for managing execution of queries querying physical data logically represented by a data abstraction model stored in a memory coupled to a processor, comprising:
 receiving a first abstract query against queryable data in a data warehouse, the first abstract query having one or more result fields configured to return requested data from the data warehouse, each result field having a corresponding logical field specification of a first data abstraction model, stored in the memory, wherein each corresponding logical field specification describes an access method for accessing physical data in the data warehouse;
 in response to receiving the first abstract query and determining that the first abstract query is configured for retrieving data from the data warehouse, detecting whether the data warehouse is available; and
 upon detection that the data warehouse is unavailable:
  creating, on the basis of the first abstract query, a second abstract query against physical data in an operational data store containing all the queryable data of the data warehouse, wherein the data warehouse and the operational data store use differently structured data structures, the second abstract query having one or more result fields configured to return the requested data from the operational data store, each result field of the second abstract query having a corresponding logical field specification of a second data abstraction model stored in the memory abstractly describing the operational data store, wherein each corresponding logical field specification describes an access method for accessing physical data in the operational data store; wherein creating the second abstract query comprises:
   for each result field of the first abstract query:
    identifying a matching logical field specification in the second data abstraction model by accessing predefined mappings describing matching logical field specifications of the first data abstraction model and the second data abstraction model; and
    adding a result field corresponding to the matching logical field specification to the second abstract query; and
  executing the second abstract query against the operational data store to obtain the requested data.

9. A computer-readable storage medium containing a program which, when executed by a processor, performs operations for managing execution of queries querying physical data logically represented by a data abstraction model stored in a memory coupled to the processor, the operations comprising:
 receiving a first abstract query against physical data in a first data source, the first abstract query having one or more result fields configured to return requested data from the first data source, each result field having a corresponding logical field specification of a first data abstraction model stored in the memory, wherein each corresponding logical field specification describes an access method for accessing physical data in the first data source;

in response to receiving the first abstract query and determining that the first abstract query is configured for retrieving data from the first data source, detecting whether the first data source is available; and upon detection that the first data source is unavailable:

creating, on the basis of the first abstract query, a second abstract query against physical data in a second data source containing at least a portion of the requested data, the second abstract query having one or more result fields configured to return at least the portion of the requested data from the second data source, each result field of the second abstract query having a corresponding logical field specification of a second data abstraction model stored in the memory abstractly describing the second data source, wherein each corresponding logical field specification describes an access method for accessing physical data in the second data source; wherein creating the second abstract query comprises:

for each result field of the first abstract query;

identifying a matching logical field specification in the second data abstraction model by accessing predefined mappings describing matching logical field specifications of the first data abstraction model and the second data abstraction model; and adding a result field corresponding to the matching logical field specification to the second abstract query; and executing the second abstract query against the second data source to obtain at least the portion of the requested data.

10. The computer-readable storage medium of claim 9, wherein the first and second data abstraction models are one of:
(i) part of a common data abstraction model; and
(ii) separate data abstraction models.

11. The computer-readable storage medium of claim 9, wherein the first and second data sources describe similar information using differently structured data structures, wherein the differently structured data structures include at least one of:
(i) different database schemas;
(ii) different database tables; and
(iii) database tables having different columns.

12. The computer-readable storage medium of claim 11, wherein the first data source defines a data warehouse having queryable data and the second data source defines an operational data store; wherein the operational data store contains all of the queryable data contained in the data warehouse.

13. The computer-readable storage medium of claim 9, wherein the operations further comprise, before creating the second abstract query:
notifying a requesting entity issuing the first abstract query that the first data source is unavailable.

14. The computer-readable storage medium of claim 13, wherein the operations further comprise:
prompting the requesting entity to indicate whether creation of the second abstract query is requested; wherein the second abstract query is only created if the creation is requested.

15. The computer-readable storage medium of claim 9, wherein the operations further comprise, before creating the second abstract query:
notifying a requesting entity issuing the first abstract query that the first data source is unavailable; and
requesting, from the requesting entity, a permission to use the second data source to determine at least the portion of the requested data; wherein the second abstract query is only created if the permission is granted.

16. A system, comprising:
a processor;
a memory coupled to the processor;
a first data source having physical data;
a second data source having physical data including at least some of the physical data contained in the first data source; and
a query builder component for managing execution of queries querying physical data logically represented by a data abstraction model stored in the memory, the query builder component being configured to:

receive a first abstract query against the physical data in the first data source, the first abstract query having one or more result fields configured to return requested data from the first data source, each result field having a corresponding logical field specification of a first data abstraction model stored in a memory, wherein each corresponding logical field specification describes an access method for accessing physical data in the first data source;

detect, in response to receiving the first abstract query and determining that the first abstract query is configured for retrieving data from the first data source, whether the first data source is available; and upon detection that the first data source is unavailable:

create, on the basis of the first abstract query, a second abstract query against the physical data in the second data source containing at least a portion of the requested data, the second abstract query having one or more result fields configured to return at least the portion of the requested data from the second data source, each result field of the second abstract query having a corresponding logical field specification of a second data abstraction model stored in the memory abstractly describing the second data source, wherein each corresponding logical field specification describes an access method for accessing physical data in the second data source; wherein creating the second abstract query comprises:

for each result field of the first abstract query;

identifying a matching logical field specification in the second data abstraction model by accessing predefined mappings describing matching logical field specifications of the first data abstraction model and the second data abstraction model; and adding a result field corresponding to the matching logical field specification to the second abstract query; and execute the second abstract query against the second data source to obtain at least the portion of the requested data.

* * * * *